United States Patent [19]

Ljung

[11] Patent Number: 4,886,364
[45] Date of Patent: Dec. 12, 1989

[54] RING LASER GYROSCOPE BEAM COMBINER FOR SEPARATING AND COMBINING CIRCULATING LASER BEAMS FOR POWER AND FRINGE PATTERN DETECTIONS

[75] Inventor: Bo H. G. Ljung, Wayne, N.J.

[73] Assignee: Kearfott Guidance & Navigation Corporation, Wayne, N.J.

[21] Appl. No.: 34,377

[22] Filed: Apr. 6, 1987

[51] Int. Cl.$^4$ ............................................. G01C 19/64
[52] U.S. Cl. ....................................... 356/350; 372/94; 350/171
[58] Field of Search .......................... 356/350; 372/94; 350/171

[56] References Cited

U.S. PATENT DOCUMENTS

| | | |
|---|---|---|
| 4,320,974 | 3/1982 | Ljung .................................. 356/350 |
| 4,582,429 | 4/1986 | Callaghan .......................... 356/350 |
| 4,585,346 | 4/1986 | Ljung .................................. 356/350 |
| 4,677,641 | 6/1987 | Podgorski .......................... 356/350 |

Primary Examiner—Vincent P. McGraw
Assistant Examiner—S. A. Turner

[57] ABSTRACT

In a monolithic gyro assembly having three ring laser gyroscopes each measuring the inertial rotation of an axis, a polyhedron having three facets is used as the beam combiner for the gyroscope. On one of the facets is mounted a fringe detector for providing inertial rotation information for the gyroscope. On the remaining two facets, on either side of the fringe detector facet, are mounted beam power monitoring diodes for measuring the power of the light intensity of the respective beams. The directly measured power from the beams is then used to move a piezoelectric transducer to maintain constant pathlengths for the gyroscope.

8 Claims, 5 Drawing Sheets

RING LASER GYROSCOPE BEAM COMBINER FOR SEPARATING AND COMBINING CIRCULATING LASER BEAMS FOR POWER AND FRINGE PATTERN DETECTIONS

FIELD OF THE INVENTION

The present invention relates to ring laser gyroscopes and more particularly to a prismatic beam combiner for a ring laser gyroscope that is also used to direct the power of the laser beams to a power monitoring means for controlling the pathlength of the ring laser gyroscope.

BACKGROUND OF THE INVENTION

In a ring laser gyroscope (RLG), to obtain accurate inertial rotation information, a constant pathlength has to be maintained. To do so, U.S. Pat. No. 4,320,094 teaches the use of an electronic circuit for calculating the respective power of the circulating light beams in the cavity of an RLG. The power thus calculated is then used to modulate a piezoelectrically activated movable mirror assembly for maintaining the pathlength constant. However, due to the fact that the signals used for calculating the power are the same signals used for generating the RLG fringe pattern, noises are inherently added into the calculated power.

SUMMARY OF THE PRESENT INVENTION

The present invention contributes to the substantial elimination of noises from a calculated power signal by using a prismatic beam combiner that has additional facets thereon for emitting the circulating laser beams. Power monitoring beams, for example PIN diodes, measure the intensities of the respective emitted laser beams and directly feed the measured power to a circuit for modulating the movable mirror assembly, thereby maintaining a constant pathlength. By thus directly measuring the power of the laser beams, the electronic components needed in the prior art for converting a fringe signal into a power signal are no longer necessary. Hence, noises picked up by these components, and added to the resultant power, are eliminated. As a consequence, a substantially noise free signal may be obtained from the present invention.

An additional advantage of the present invention includes the obvious fact that electronic components for converting fringe output signals to power signals are no longer needed.

Prior to the present invention, for a monolithic gyro assembly having three ring laser gyroscopes each measuring a single axis, there is no room for the necessary power detectors. Thus, another advantage of the present invention resides in the fact that since the present invention beam combiner is also being used to measure the intensities of the laser beams, such over crowding problem is eliminated.

The above-mentioned objects and advantages of the present invention will be more clearly understood when considered in conjunction with the accompanying drawings, wherein:

DETAILED DESCRIPTION OF THE PRESENT INVENTION

Figure 1:
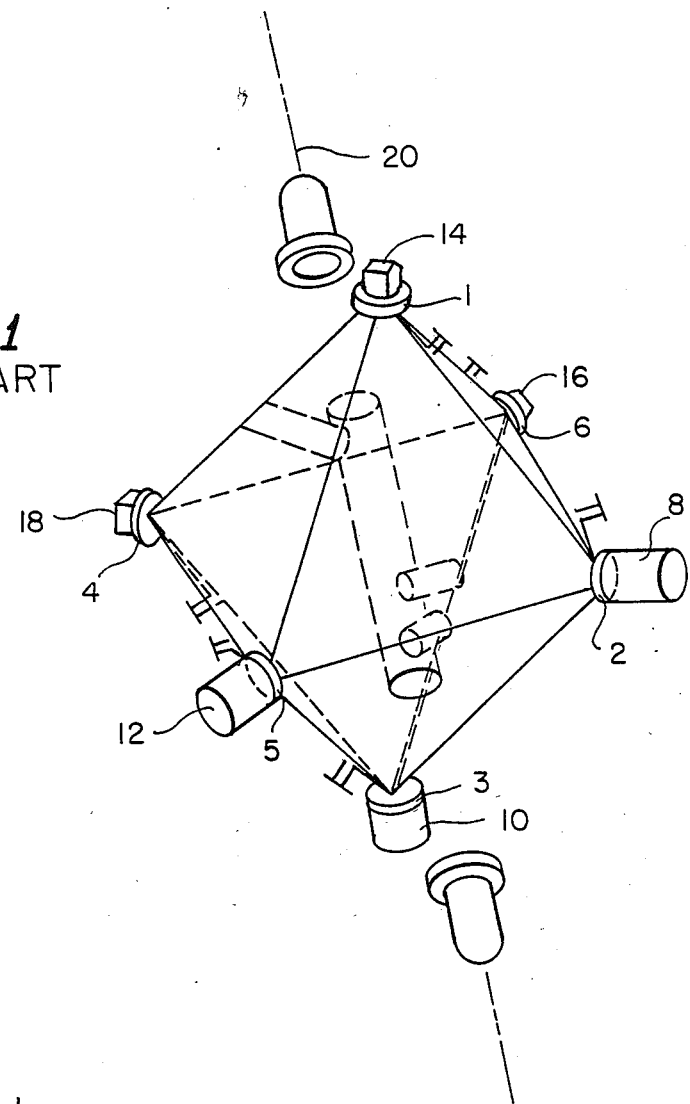
FIG. 1 is a schematic disassembled view of a prior art monolithic gyroscope assembly having three ring laser gyroscopes.

Referring to FIG. 1, a schematic illustration of a monolithic three RLG gyro assembly is shown. Mirrors 1 to 6 are respectively positioned in the center of each cube body face. The cube is machined such that a small diameter bore connects adjacent mirrors. A closed optical cavity is defined between four mirrors which are placed in one plane and are interconnected by bores. Thus, a total of three optical cavities are formed between the mirrors as follows: 2, 5, 4, 6; 1, 5, 3, 6; and 1, 2, 3, 4. Each cavity defined by these bores is filled with a helium-neon gas mixture which causes lasing due to well known principles.

As shown, there are three mutually orthogonal beam paths in FIG. 1. Each of the beam paths serves to detect angular rotation about a separate axis. These beam paths may be defined by the optical cavities which are mentioned above between mirrors 2, 5, 4 and 6; 1, 5, 3, and 6; and 1, 2, 3 and 4. In essence, each mirror is incorporated in the beam path of two orthogonal planes. Otherwise stated, each mirror is utilized for two orthogonal RLG's respectively associated with two separate axes.

Further shown in FIG. 1 are piezoelectric transducers 8, 10 and 12, coupled to mirrors 2, 3 and 5, respectively. The operation of these piezoelectric transducers is well known and it is further known that these transducers can modulate the corresponding pathlengths of the respective RLG's (by flexing the corresponding mirrors) such that a constant pathlength is maintained for each RLG in the gyro assembly. See U.S. Pat. No. 4,320,974, having the same inventor and assignee as the present invention.

As is usual in RLG's, each RLG has laser light waves propagating in opposite directions. Any frequency difference in these two light waves represents an inertial rotation. In order to avoid the "lock-in" effect, the monolithic assembly is dithered about axis 20, equally shared by the three RLG's.

Also shown in FIG. 1 are beam combiners 14, 16 and 18, associating respectively with mirrors 1, 4, and 6. These beam combiners would generate fringe patterns, one for each axis, for the gyro assembly. As is well known, by measuring the fringe patterns, the inertial orientation of the gyro assembly, can be ascertained. Such an assembly, has been fully described in U.S. Pat.

No. 4,477,188, having as one of the co-inventors the instant inventor and assigned to the same assignee as the present invention.

Figure 2B:
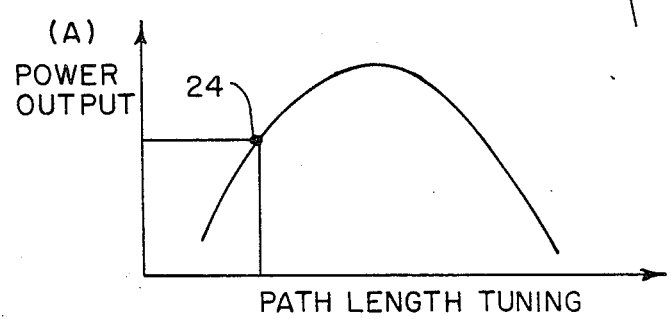
FIG. 2B is a diagram showing the power output in relation to the tuning of the pathlength.
Figure 2A:
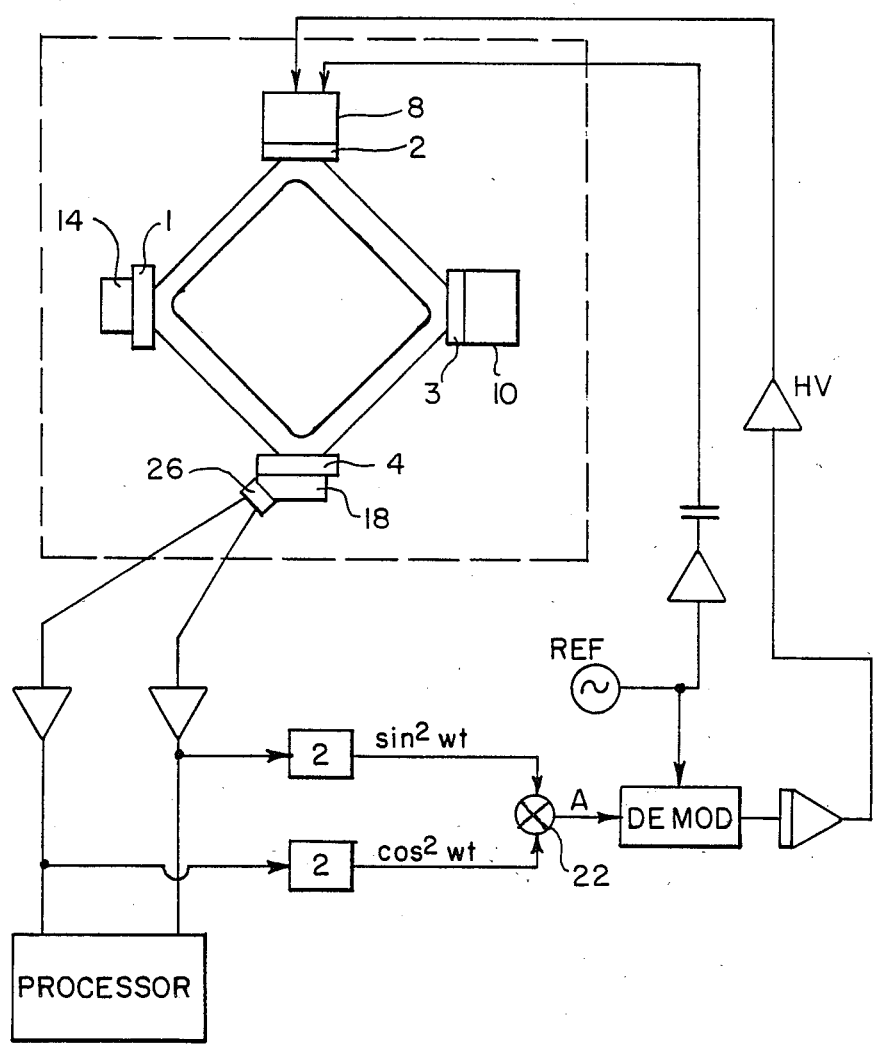
FIG. 2A is a combination of a cross-sectional view of one RLG and a prior art circuit for effecting the control of its pathlength.

FIG. 2A shows in simplified form the teaching of U.S. Pat. No. 4,320,974, which pertains to the controlling of the pathlength of an RLG. As shown in FIG. 2A, an RLG, which can be represented by any one of the three available RLG's of the FIG. 1 gyro assembly, has connected thereto a simplified circuitry for controlling its pathlength.

Take for example the RLG defined by cavity 1, 2, 3 and 4. There is shown a simplified electric circuitry having two outputs from beam combiner 18 and two inputs to transducer 8 for maintaining the pathlength of this RLG. As taught in the '974 patent, the output signals from beam combiner 18, in addition to being used for generating a fringe pattern, are amplified and squared before being summed by an adder 22. The inertial rotation of the RLG, in the meantime, is calculated in the processor. The summed power, represented by A, is then demodulated and integrated before being fed to transducer 8. The demodulator is driven by a reference oscillator, which frequency is also used to capacitively drive transducer 8, which is constantly modulated and moved so as to maintain a constant pathlength for the RLG.

The laser beam has characteristics of a bell-shaped curve, shown in FIG. 2B. A correctly tuned laser beam rests on the peak of the curve. But if there is mistuning, the power output of the laser beam is lower, for example at the point indicated by 24. Thus, by modulating mirror 2 via transducer 8, point 24 can be moved along the curve such that the intensity of the laser beam is brought to the maximum. Changes in the pathlength of the RLG due to for instance thermal expansion causes the pathlength transducer to move in such a way as to maintain the pathlength.

Figure 3A:
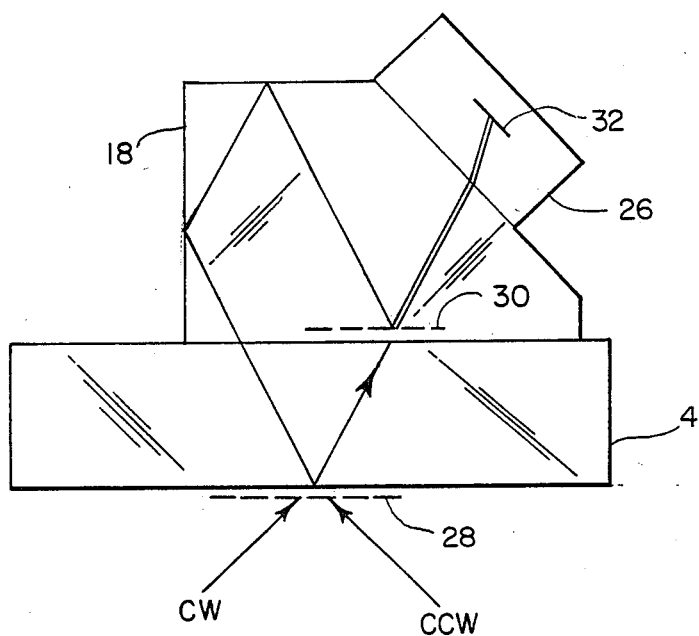
FIG. 3A is a cross-sectional view of a prior art beam combiner of an RLG.
Figure 3B:
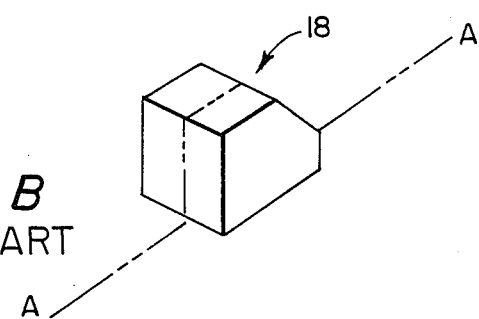
FIG. 3B is an isometric representation of a prior art beam combiner prism shown in FIG. 3A.

The beam combiner used for emitting the opposite propagating light waves in FIG. 2A is shown isometrically in FIG. 3B. Referring to FIG. 3A, a cross-sectional view of beam combiner 18—plus photodetector 26, which is used for intercepting the combined beams—is shown. In brief, the two light beams, represented as CW and CCW, propagate toward a coating 28 on mirror 4. The coating allows approximately 0.0001 of the light to pass through. The CCW beam is transmitted to beam combiner 18 and redirected against a second coating 30, which is approximately 50% transmissive. At the same time, the CW beam is directed past coating 30, through beam combiner 18 and converge with the transmitted CCW beam, on photosensitive element 32 of photodetector 26. The combined beams can converge or diverge with an angular separation of approximately 100° arc therebetween. As is well known, these combined beams create the fringe pattern, from which the inertial rotational information of the gyro assembly is derived. As shown in FIG. 3A, it should be appreciated that beam combiner 18, as is well documented, is light transmissive.

Figure 4:
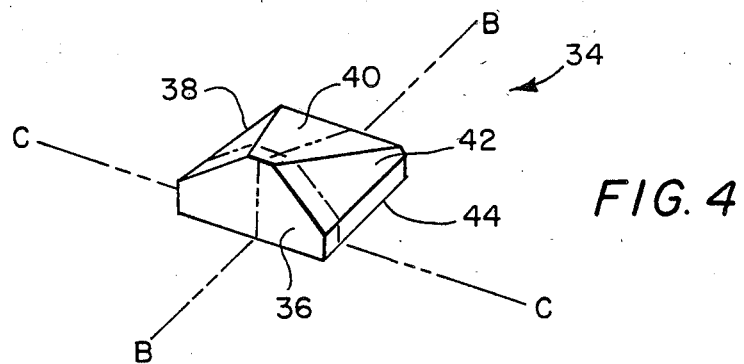
FIG. 4 is an isometric view of the combination beam combiner and intensity emitter of the present invention.
Figure 5A:
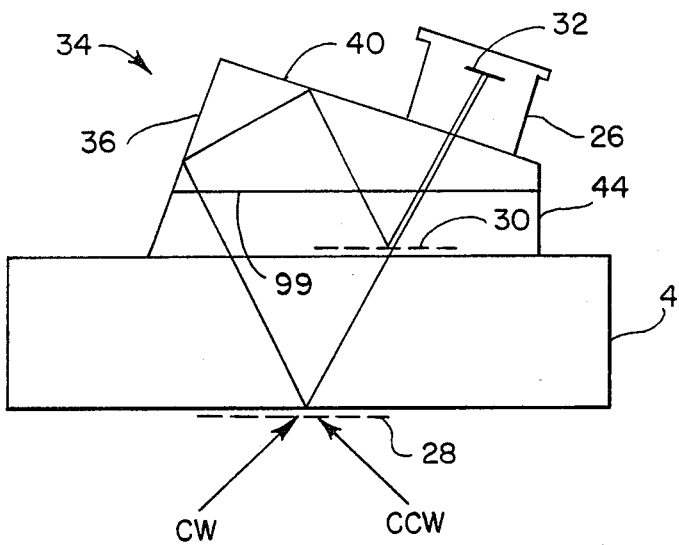
FIG. 5A is a cross-sectional view of the FIG. 4 polyhedron beam combiner drawn along line B—B.
Figure 5B:
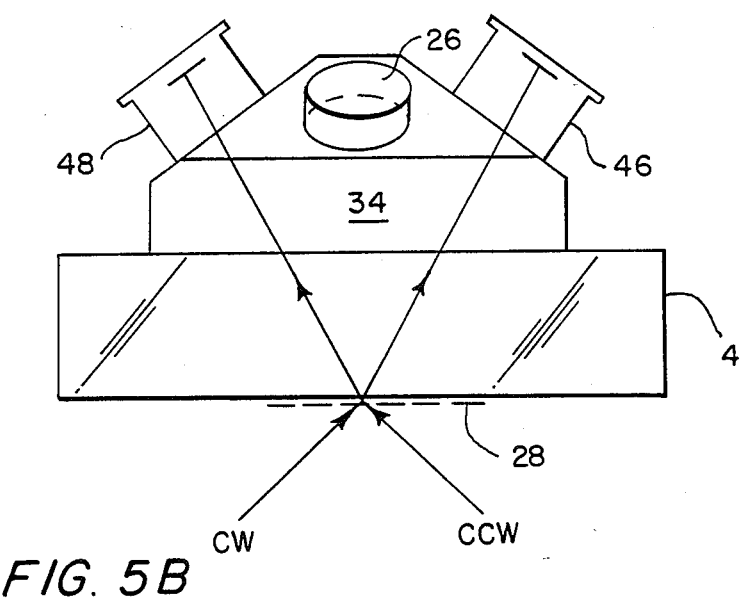
FIG. 5B is a cross-sectional view of the FIG. 4 polyhedron beam combiner having power monitoring means drawn along line C—C.

Referring now to FIG. 4, there is shown a schematic representation of a polyhedron which corresponds to beam combiner 18 of FIGS. 3A and 3B. To simplify matters, the polyhedron will henceforth be referred to as beam combiner 34, albeit it should be appreciated that this beam combiner performs more functions than a beam combiner, such as 18 of the prior art. Beam combiner 34 has facets 36, 38, 40 and 42. Facet 40 extends downwardly from the top parallel side of facet 36. The remaining facets 38 and 42 also extend from facet 36, but at the respective nonparallel sides thereof. As can be seen, one side of each of facets 38 and 42 is in abutting relationship with the nonparallel sides of facet 40. Also shown is a rectangular facet 44, situated on one side of combiner 34, adjacent to facets 42 and 36. A similar facet is located on the other side of facet 36 and is not shown. Similarly, a front rectangular facet abutting facet 40 is also not shown. It must be appreciated that the FIG. 4 configuration is shown for illustration purposes only and a differently configured prism providing for sufficient number of facets for both power monitoring means and a fringe detector can also be used, as long as the angles of incidence of the prism are such that the beams from the two pairs of counter propagating laser beams circulating about the two beam paths orthogonal to the prism can be respectively combined and separated. See for example FIGS. 2A and 5 where mirror 4 is impinged by the CW and CWW beams from beam path 1, 2, 3, 4; and FIG. 5B where mirror 4 is impinged by the CW and CWW beams from beam path 2, 5, 4, 6. More specifically, in FIG. 5A, beam combiner 34 is seen cross-sectionally along line B—B; and the CW and CWW beams from beam path 1, 2, 3, 4 (according to the FIG. 2A configuration) are combined and directed to photosensitive element 32 for effecting the fringe patterns for the axis of the gyroscope assembly about beam path 1, 2, 3, 4. In FIG. 5B, the necessity for requiring low incidence angles is due to the need for total internal reflection. Such reflection occurs without the losses that afflict reflections at small angles of incidence, which must be aided by reflective coatings on the surfaces. Total internal reflection, on the other hand, may not need such coatings.

Figure 5C:
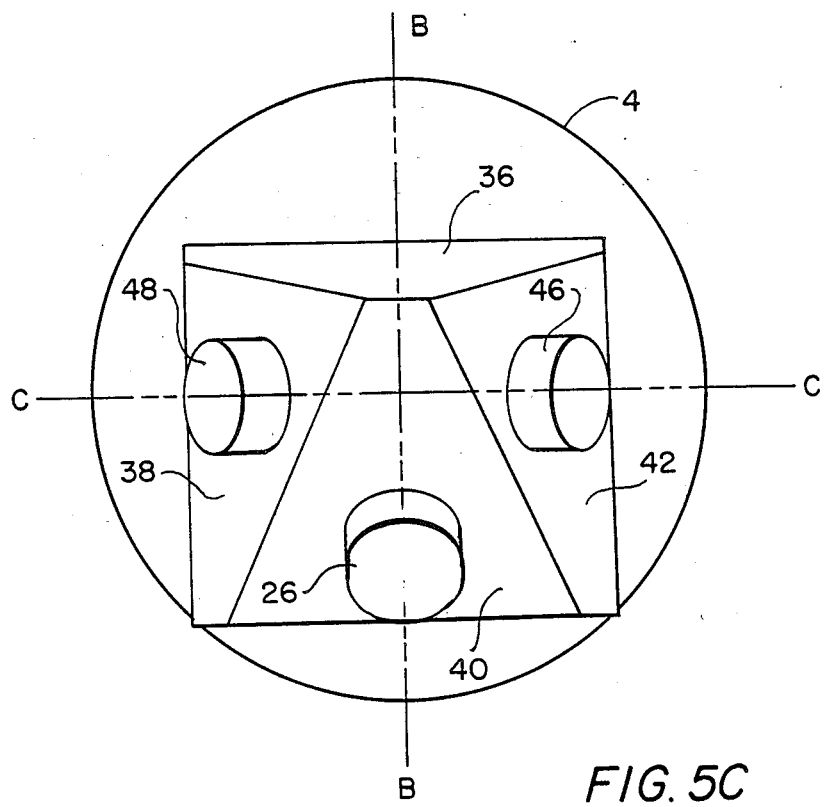
FIG. 5C is a top plan view of the FIG. 4 illustration.

FIGS. 5B and 5C show respectively a cross-sectional view and a plan view of the beam combiner of the present invention wherein corresponding power monitoring devices have been added. Referring to FIG. 5C, there is shown a pair of power monitoring diodes 46 and 48 mounted on facets 42 and 38, respectively. Fringe photodetector 26 is mounted on facet 40. The power monitoring diodes may be PIN photodetectors. Since the construction and operation of these power monitoring diodes are well known, suffice it to say that by using these diodes, the power of the laser beams can be directly measured, thereby eliminating the need for the components outlined with respect to the discussion of the FIG. 2A circuit.

Referring now to the cross-sectional view of FIG. 5B, it can be seen that the CW and CCW light waves propagating in the RLG having beam path 2, 5, 4, 6 are separated by beam combiner 34 and fed to power monitoring diodes 46 and 48, respectively. Thus, beam combiner 34 not only combines the CW and CCW beams from beam path 1, 2, 3, 4, for the fringe detector, it also separates the beams from beam path 2, 5, 4, 6, and directs them to power monitoring diodes.

Figure 6:
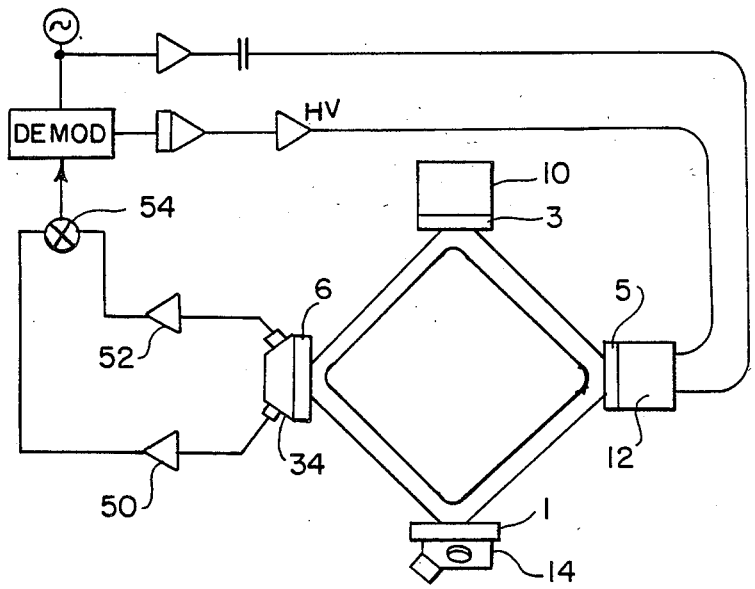
FIG. 6 is a schematic, using the FIG. 5 beam combiner, for illustrating the simplified pathlength control circuitry.

FIG. 6 shows in simplified form the circuitry for modulating the pathlength of an RLG. Take for example RLG 1635. It must be recognized that two beam combiners and two piezoelectric transducers are used with each RLG. Bearing that in mind, it can be seen that the circuitry connects beam combiner 34 to transducer 12. As shown, instead of having squaring circuits, the respective power from the light waves is separately measured by preamplifiers 50 and 52 before being summed by an adder 54. As is readily apparent, the elimination of the squaring circuits not only saved components from the circuit, it also eliminated possible noise distortions that may be picked up. Moreover, by directly measuring the light intensities, a more accurate power output is obtained.

Operationally, as in the previously described FIG. 2A circuit, the summed power is sent to a demodulator and subsequently is integrated and fed to transducer 12 which, upon receipt of the signal sent by the reference oscillator, moves mirror 5 to maintain the pathlength of the RLG despite temperature variations caused possibly by the environment or from the gyro assembly being heated by nearby electronic components. It should be appreciated that the remaining two RLG's of the gyro assembly operate in similar fashion to that of RLG 1635. And since each of the mirrors is associated with two RLG's, beam combiner 14 of mirror 1 is used to output light intensities of RLG 1234.

In a gyro assembly having three RLG's, all three RLG pathlengths have to be maintained at respective constant lengths simultaneously. U.S. Pat. No. 4,585,346, by the same inventor an assigned to the same assignee, teaches how this is done. Since the beam combiner of the present invention can have mounted thereon the fringe detector as well as the power monitoring diodes, all of the necessary fringe detectors and power monitoring diodes can be fitted right on the monolithic gyro assembly, thereby allowing for a more compact assembly.

Insofar as the present invention is subject to many variations, modifications and changes in detail, it is intended that all matter described in this specification and shown in the accompanying drawings be interpreted as illustrative and not in a limiting sense. Accordingly, it is intended that the invention be limited by the spirit and scope of the appended claims.

I claim:

1. In a multi-axis ring laser gyroscope assembly having a plurality of cavities wherein corresponding pairs of counter propagating laser beams circulate, respective portions of the circulating laser beams escaping from each of the cavities, each of the cavities corresponding to one of the axes of the gyroscope assembly, respective movable mirror assemblies for controlling the pathlength of each pair of laser beams circulating in each of the cavities, the improvement comprising:
   a plurality of beam combiner means;
   wherein each beam combiner means is positioned at a respective junction where corresponding two of the plurality of cavities meet, respective laser beam portions of corresponding two pairs of laser beams circulating within the corresponding two cavities escaping from the two cavities at the respective junction, the beam combiner means separating and directing the escaped laser beam portions from one of the two pairs of circulating laser beams to a respective first and second facet thereof, the beam combiner means further combining and directing the escaped laser beam portions from the other of the two pairs of circulating laser beams to a third facet thereof, the beam combiner means having mounted thereon:
   (a) separate monitor means at its respective first and second facets for individually monitoring the power of one of the separated laser beam portions of the one pair of circulating laser beams; and
   (b) a fringe detector at its third facet for receiving the combined laser beam portions from the other pair of circulating laser beams to effect fringe patterns for the axis corresponding to the other pair of circulating beams.

2. The multi-axis ring laser gyroscope set forth in claim 1, further comprising:
   respective means for utilizing the individually monitored power of each of the axes to actuate the corresponding movable mirror assembly, so as to maintain an optimal pathlength for the laser beams circulating in the cavity corresponding to each of the axes.

3. The ring laser gyroscope set forth in claim 2, wherein the utilizing means comprises:
   means for amplifying the monitored power of the respective separated laser beam portions;
   means for summing the amplified separated laser beam portion power;
   means connected between the output of the summing means and the movable mirror assembly for maximizing the summed beam portion power;
   whereby the movable mirror assembly is modulated by the maximized summer beam portion power for effecting the optimal pathlength.

4. The ring laser gyroscope assembly set forth in claim 1, wherein the beam combiner means comprises a prismatic polyhedron including:
   at least three facets corresponding to the first, second and third facets, the third facet interposing between the first and second facets, each of the facets having respective non-parallel sides, each non-parallel side of the third facet being in abutting relationship with a corresponding non-parallel side of one of the first and second facets, each of the first and second facets offsetting downwardly away from the corresponding non-parallel side of the third facet to which its corresponding non-parallel side abuts.

5. The ring laser gyroscope set forth in claim 1, wherein each power monitoring means comprises a PIN diode.

6. A monolithic gyro assembly comprising:
   three ring laser gyroscope for detecting inertial rotations about three axes, each of the axes having a corresponding cavity including four corners wherein a corresponding pair of laser beams circulate, each of the corners intercepting two pairs of circulating laser beams, respective portions of the laser beams escaping from the cavity at at least one of the corners; wherein each gyroscope has a movable mirror assembly for controlling the pathlength of the gyroscope;
   three beam combiner means each having a plurality of facets;
   wherein each beam combiner means is positioned at a respective junction where a corner of corresponding two of the cavities meet for intercepting the two respective pairs of laser beams circulating within the corresponding two cavities, the beam combiner means combining and directing respective laser beam portions escaping from one of the corresponding two cavities to one of its facets, and separating and directing respective laser beam portions escaping from the other of the corresponding two cavities to respective other facets thereof;
   the beam combiner having mounted thereon:
   a power monitoring means at each one of its respective other facets for measuring individually the power of one of the separated laser beam portions escaping from the other of the corresponding two cavities; and a fringe detector at its one facet for receiving the combined escaping laser beam portions from the one of the two corresponding cavities, the combined escaping laser beam portions being representative of the inertial rotation of the gyro assembly about the axis of the one of the two corresponding cavities;

wherein the power monitoring means and the fringe detector measure and receives, respectively, laser beam portions from laser beams circulating about different axes orthogonal to the beam combiner means.

7. The gyro assembly set forth in claim 6, wherein each beam combiner means comprises:

a light transmissive block having at least three facets, each of the facets having respective non-parallel sides, one of the facets interposing between the other two, each of the respective non-parallel sides of the one facet being in abutting relationship with a corresponding non-parallel side of each of the other two facets, each of the other two facets offsetting downwardly away from the respective non-parallel side of the one facet to which its corresponding non-parallel side abuts.

8. The gyro assembly set forth in claim 6, wherein each power monitoring means comprises:

a PIN diode optically communicating with either one of the other two facets for measuring the power of one of the separated laser beams.

* * * * *